US012670293B2

(12) United States Patent
Schmidt et al.

(10) Patent No.: US 12,670,293 B2
(45) Date of Patent: Jun. 30, 2026

(54) METHOD TO IMPROVE TRAINING OF CLASSIFIERS WHEN USING DATA WITH PERSONAL IDENTIFIABLE INFORMATION

(71) Applicant: Robert Bosch GmbH, Stuttgart (DE)

(72) Inventors: Hauke Schmidt, Sunnyvale, CA (US); Stefan Gehrer, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 262 days.

(21) Appl. No.: 18/313,447

(22) Filed: May 8, 2023

(65) Prior Publication Data
US 2024/0378311 A1 Nov. 14, 2024

(51) Int. Cl.
*G06F 21/62* (2013.01)

(52) U.S. Cl.
CPC ...... *G06F 21/6245* (2013.01); *G06F 21/6254* (2013.01)

(58) Field of Classification Search
CPC ............ G06F 21/6245; G06F 21/6254; G06F 18/214; G06N 20/00; G06N 3/08
See application file for complete search history.

(56) References Cited

U.S. PATENT DOCUMENTS

| | | | |
|---|---|---|---|
| 2021/0012032 A1* | 1/2021 | Bishop | G16H 30/20 |
| 2021/0342997 A1* | 11/2021 | Malreddy | G06T 7/70 |
| 2022/0021660 A1* | 1/2022 | Trieflinger | H04L 63/0414 |
| 2022/0114491 A1* | 4/2022 | Kelly | G06N 20/00 |

OTHER PUBLICATIONS

Zhuang, Fuzhen, et al. "A comprehensive survey on transfer learning." Proceedings of the IEEE 109.1 (2020): 43-76.

* cited by examiner

*Primary Examiner* — Yogesh Paliwal
(74) *Attorney, Agent, or Firm* — Brooks Kushman P.C.

(57) ABSTRACT
An approach for managing privacy-relevant data. Disclosed embodiments significantly improve the computational efficiency of training machine-learning models while still protecting privacy-relevant data in the training data.

20 Claims, 5 Drawing Sheets

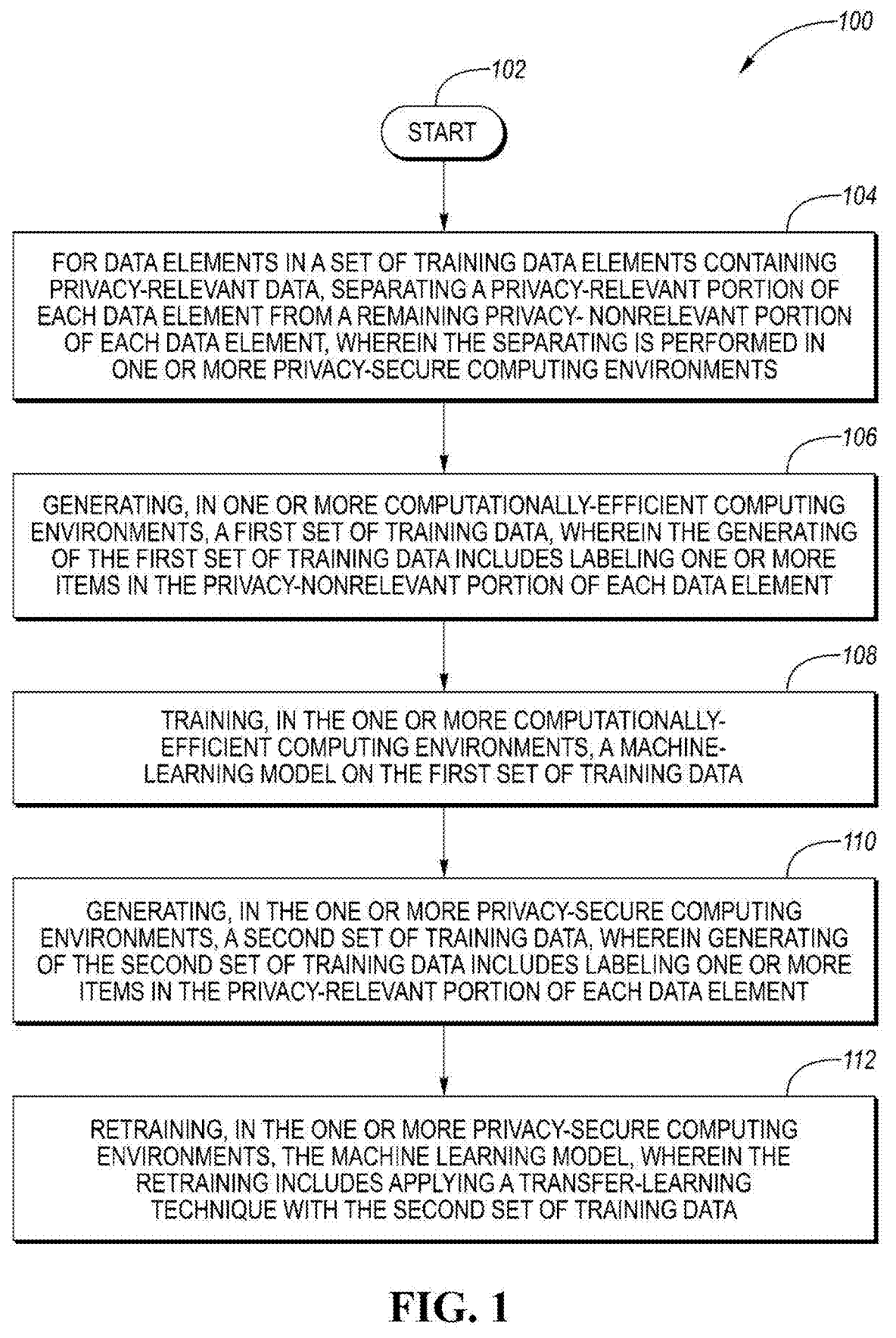

—100

—102

START

—104

FOR DATA ELEMENTS IN A SET OF TRAINING DATA ELEMENTS CONTAINING PRIVACY-RELEVANT DATA, SEPARATING A PRIVACY-RELEVANT PORTION OF EACH DATA ELEMENT FROM A REMAINING PRIVACY- NONRELEVANT PORTION OF EACH DATA ELEMENT, WHEREIN THE SEPARATING IS PERFORMED IN ONE OR MORE PRIVACY-SECURE COMPUTING ENVIRONMENTS

—106

GENERATING, IN ONE OR MORE COMPUTATIONALLY-EFFICIENT COMPUTING ENVIRONMENTS, A FIRST SET OF TRAINING DATA, WHEREIN THE GENERATING OF THE FIRST SET OF TRAINING DATA INCLUDES LABELING ONE OR MORE ITEMS IN THE PRIVACY-NONRELEVANT PORTION OF EACH DATA ELEMENT

—108

TRAINING, IN THE ONE OR MORE COMPUTATIONALLY-EFFICIENT COMPUTING ENVIRONMENTS, A MACHINE-LEARNING MODEL ON THE FIRST SET OF TRAINING DATA

—110

GENERATING, IN THE ONE OR MORE PRIVACY-SECURE COMPUTING ENVIRONMENTS, A SECOND SET OF TRAINING DATA, WHEREIN GENERATING OF THE SECOND SET OF TRAINING DATA INCLUDES LABELING ONE OR MORE ITEMS IN THE PRIVACY-RELEVANT PORTION OF EACH DATA ELEMENT

—112

RETRAINING, IN THE ONE OR MORE PRIVACY-SECURE COMPUTING ENVIRONMENTS, THE MACHINE LEARNING MODEL, WHEREIN THE RETRAINING INCLUDES APPLYING A TRANSFER-LEARNING TECHNIQUE WITH THE SECOND SET OF TRAINING DATA

FIG. 1

METHOD TO IMPROVE TRAINING OF CLASSIFIERS WHEN USING DATA WITH PERSONAL IDENTIFIABLE INFORMATION

TECHNICAL FIELD

The present disclosure relates to data security and data privacy. In some disclosed embodiments security-relevant data in a set of training data can be protected during training of a machine learning model on the set of training data.

BACKGROUND

Private and/or public (e.g., government) entities may desire to use data gathered by sensors (e.g., cameras, micro-phones, GPSs, and the like) for a variety of purposes. In some instances, this data may contain privacy-relevant information (e.g., personally identifiable information (PII) and confidential or secret information). Improper gathering or handling of this data may violate local, regional, or global privacy laws—such as General Data Protection Regulation (GDPR) or the California Consumer Privacy Act (CCPA).

Training data used for training machine-learning models may include privacy-relevant data. Privacy-relevant data herein refers to data including privacy-relevant information that is intended to be protected, for example, to prevent violating confidentiality agreements, or secrecy agreements, or privacy laws. For example, under privacy regulations, such as the GDPR, storage, usage, and transfer of such data is limited.

SUMMARY

One approach to protecting privacy-relevant data in train-ing data is to perform all processing of privacy-relevant data in a privacy-secure computing environment. A privacy-secure computing environment herein refers to a computing environment that is predetermined to be sufficiently secure to protect the privacy-relevant data. Examples of privacy-secure computing environments used in disclosed embodi-ments may include, for example, computing environments with trusted hardware (e.g., Trusted Execution Environment ("TEE")) or computing environments that use other Privacy Enhancing Technologies ("PET") (e.g., Homomorphic Encryption ("HE") or Secure Multi-Party Computation ("SMPC")).

In some disclosed embodiments, each training data ele-ment in a set of training data elements is separated into a privacy-relevant portion and a privacy-nonrelevant portion. Some training data elements may not include any privacy-relevant data, in which case the privacy-nonrelevant portion will comprise the entire training data element. Disclosed embodiments may perform all processing involving privacy-relevant data (e.g., privacy-relevant portions of training data elements) in one or more privacy-secure computing envi-ronments.

Disclosed embodiments may process data that does not include privacy-relevant data (e.g., privacy-nonrelevant por-tions of training data elements) in a computationally-effi-cient computing environment. A computationally-efficient computing environment herein refers to a computing envi-ronment that is predetermined to be more computationally efficient than a privacy-secure computing environment.

Processing involving training data may include collecting or gathering of training data, transmitting training data, storing training data, separating training data (e.g., into privacy-relevant portions and privacy-nonrelevant portions), labeling items in training data, and training machine-learn-ing models on training data. In some disclosed embodi-ments, the percentage of training data that is privacy-relevant may be significantly less than the percentage of training data that is privacy-nonrelevant. Accordingly, in some disclosed embodiments, processing of training data can be made significantly more computationally efficient while still protecting privacy relevant data by processing privacy-relevant data in a privacy-secure environment and processing privacy-nonrelevant data in a computationally-efficient environment.

In some disclosed embodiments, methods for managing privacy-relevant data are disclosed. Disclosed methods may comprise: for data elements in a set of training data elements containing privacy-relevant data, separating a privacy-rel-evant portion of each data element from a remaining pri-vacy-nonrelevant portion of each data element, wherein the separating is performed in one or more privacy-secure computing environments; generating, in one or more com-putationally-efficient computing environments, a first set of training data, wherein the generating of the first set of training data includes labeling one or more items in the privacy-nonrelevant portion of each data element; training, in the one or more computationally-efficient computing environments, a machine-learning model on the first set of training data; generating, in the one or more privacy-secure computing environments, a second set of training data, wherein generating of the second set of training data includes labeling one or more items in the privacy-relevant portion of each data element; and retraining, in the one or more privacy-secure computing environments, the machine-learning model, wherein the retraining includes applying a transfer-learning technique with the second set of training data. Some disclosed embodiments disclose non-transitory memory comprising processor-executable instructions that when executed by one or more processors causes a system to perform operations including: for data elements in a set of training data elements containing privacy-relevant data, separating a privacy-relevant portion of each data element from a remaining privacy-nonrelevant portion of each data element, wherein the separating is performed in one or more privacy-secure computing environments; generating, in one or more computationally-efficient computing environments, a first set of training data, wherein the generating of the first set of training data includes labeling one or more items in the privacy-nonrelevant portion of each data element; training, in the one or more computationally-efficient computing environments, a machine-learning model on the first set of training data; and generating, in the one or more privacy-secure computing environments, a second set of training data, wherein generating of the second set of training data includes labeling one or more items in the privacy-relevant portion of each data element; and retraining, in the one or more privacy-secure computing environments, the machine-learning model, wherein the retraining includes applying a transfer-learning technique with the second set of training data. Some disclosed embodiments disclose systems com-prising: one or more processors; and non-transitory memory communicatively connected to the one or more processors, the non-transitory memory comprising processor-executable instructions that when executed by the one or more proces-sors causes the system to perform operations including: for data elements in a set of training data elements containing privacy-relevant data, separating a privacy-relevant portion of each data element from a remaining privacy-nonrelevant portion of each data element, wherein the separating is performed in one or more privacy-secure computing environments; generating, in one or more computationally-efficient computing environments, a first set of training data, wherein the generating of the first set of training data includes labeling one or more items in the privacy-nonrelevant portion of each data element; training, in the one or more computationally-efficient computing environments, a machine-learning model on the first set of training data; generating, in the one or more privacy-secure computing environments, a second set of training data, wherein generating of the second set of training data includes labeling one or more items in the privacy-relevant portion of each data element; and retraining, in the one or more privacy-secure computing environments, the machine-learning model, wherein the retraining includes applying a transfer-learning technique with the second set of training data.

BRIEF DESCRIPTION OF THE DRAWINGS

FIG. 1 illustrates a flowchart of an example method in accordance with disclosed embodiments.

DETAILED DESCRIPTION

Figure 2:
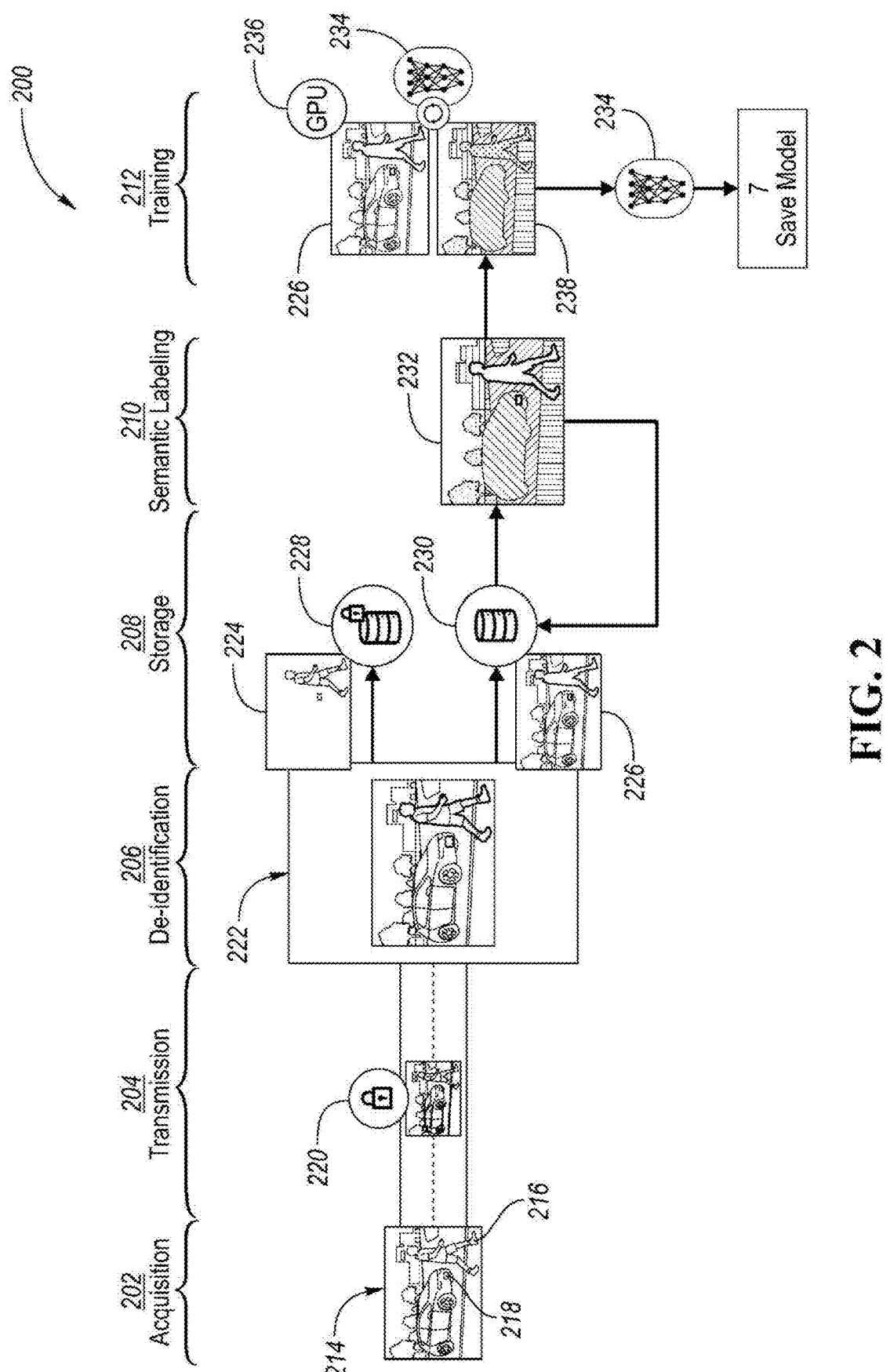
FIG. 2 illustrates operations of an example method in accordance with disclosed embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates an example method 100 in accordance with disclosed embodiments. The disclosed method 100 may be advantageously utilized to manage privacy-relevant data during a process for training a machine-learning model. The method 100 starts at operation 102. The disclosed method 100 may have access to training data elements that contain privacy-relevant data. The disclosed method 100 may use a plurality of training data elements to train a machine-learning model. Each training data element may comprise at least one of image data, audio data, sensor data, and Global Positioning System ("GPS") data.

For data elements in a set of training data elements containing privacy-relevant data, the disclosed method 100 separates a privacy-relevant portion of the data element from a remaining privacy-nonrelevant portion of each data element. Methods known in the art may be used to separate a privacy-relevant portion of a data element from a remaining privacy-nonrelevant portion of the data element. In some embodiments, the training data elements comprise image data and the disclosed method 100 identifies pixels in the image data that belong to privacy-relevant portions. Remaining pixels in a training data element may comprise the privacy-nonrelevant portion. The disclosed method 100 performs operation 104, including the data separating, in one or more privacy-secure computing environments. For example, multiple privacy-secure computing environments may be used in some disclosed embodiments to take advantage of parallel processing in the multiple privacy-secure computing environments. The privacy-relevant portions may be stored in the one or more privacy-secure computing environment and/or securely transmitted to another privacy-secure computing environment.

The disclosed method 100 generates a first set of training data at operation 106 in one or more computationally-efficient computing environments. The generating of the first set of training data includes labeling one or more items in the privacy-nonrelevant portion of each data element. In some embodiments, aspects of the labeling or other aspects of the generating may be performed by a person. However, human-involvement in labeling or generating aspects does not mean the computing environment is not computationally efficient. Other aspects of a computing environment may make it computationally efficient (e.g., the use of a computationally-efficient database or a computationally-efficient user interface). In some disclosed embodiments, the generating of the first set of training data further comprises: prior to labeling the one or more items in the privacy-nonrelevant portion of each data element, combining the privacy-nonrelevant portion of each data element with replacement privacy-nonrelevant data to replace the separated privacy-relevant portion with the replacement privacy-nonrelevant data. In some disclosed embodiments, the replacement privacy-nonrelevant data may comprise artificial data. In some disclosed embodiments, the artificial data comprised a generated image of a face. For example, disclosed embodiments may use Generative Adversarial Network ("GAN") or transformer techniques to replace privacy-relevant real faces in privacy-relevant portions with generated faces.

The disclosed method 100 trains a machine-learning model on the first set of training data at operation 108 in one or more computationally-efficient computing environments. In some disclosed embodiments, the machine-learning model comprises a neural network, such as a convolutional neural network. In some disclosed embodiments, the machine-learning model comprises a convolutional encoder-decoder.

The disclosed method 100 generates a second set of training data at operation 110 in the one or more privacy-secure computing environments. The generating of the second set of training data includes labeling one or more items in the privacy-relevant portion of each data element.

At operation 112, the disclosed method 100 retrains the machine-learning model. The retraining of the machine-learning model is performed in the one or more privacy-secure computing environments and includes applying a transfer-learning technique with the second set of training data.

FIG. 2 illustrates example operations of a method 200 in accordance with disclosed embodiments. In some disclosed embodiments, method 200 includes training a machine-learning model on training data comprising image data that includes privacy-relevant data. In an acquisition operation 202, the method 200 acquires a plurality of images to be used as training data. The images may be acquired from one or more sensors (e.g., cameras). In some disclosed embodiments, the sensors may be embedded on a vehicle being trained for automatic driving. For example, the image data 214 may be acquired by a front video camera on a vehicle. The image data 214 includes a person 216 and a license plate 218, which may be PII (i.e., privacy-relevant data). In some embodiments, the trained machine-learning model is a neural network architecture that performs semantic segmentation.

In a transmission operation 204, the method 200 securely transmits 220 each acquired image to a privacy-secure computing environment 222. The privacy-secure computing environment 222 may include, for example, computing environments with trusted hardware (e.g., Trusted Execution Environment ("TEE")) or computing environments that use other Privacy Enhancing Technologies ("PET") (e.g., Homomorphic Encryption ("HE") or Secure Multi-Party Computation ("SMPC")). The secure transmission of the image data 214 to a privacy-secure computing environment 222 protects the image data 214 from unauthorized access and allows the source (e.g., a vehicle) of the image data 214 to remotely attest the integrity of the privacy-secure computing environment 222.

A de-identification operation 206 semantically identifies pixels in the images that are considered privacy-relevant. In some disclosed embodiments, a neural network is used to semantically identify the privacy-relevant pixels. For each image, the privacy-relevant pixels collectively form a privacy-relevant portion 224 of an image. The privacy-relevant portion 224 of an image can be removed or masked out of an image. The remaining pixels in the image collectively form a privacy-nonrelevant portion 226 of the image.

In a storage operation 208, the privacy-relevant portion 224 may be securely stored in a secured/encrypted database 228. The privacy-nonrelevant portion 226 may be stored in a database 230 that does not meet the same security requirements as the secured/encrypted database 228. In some embodiments, most pixels in the image data 214 are privacy-nonrelevant and many images may not contain any privacy-relevant pixels at all.

Labeled data is needed to train a machine-learning model. In a first semantic labeling operation 210, the items in the privacy-nonrelevant portion 226 of each image are labeled to generate a first set of training data. For example, a first item (e.g., object) may be labeled as a "tree", a second item may be labeled as a "vehicle", and a third item may be labeled as a "building". In some disclosed environments, the privacy-nonrelevant portions 226 with labeled items 232 collectively comprise the first set of training data.

Since the privacy-nonrelevant portion 226 of each image does not contain any privacy-relevant data, the first semantic labeling 210 of the privacy-nonrelevant portion 226 of each image may be performed in a computationally-efficient computing environment. A computationally-efficient environment provides for more freedoms when it comes to storing, processing, and sharing privacy-nonrelevant data. For example, a computationally-efficient computing environment may utilize hardware such as certain Graphics Processing Units ("GPU") 236 that are not permitted in privacy-secure computing environments. In some embodiments, the first semantic labelling 210 yields precise and cost-efficient labels, which may be stored in an unencrypted database, such as database 230 in FIG. 2.

In some disclosed embodiments, prior to labeling items in the privacy-nonrelevant portion 226 of each data element, the method 200 combines the privacy-nonrelevant portion 226 of each data element with replacement privacy-nonrelevant data to replace the separated privacy-relevant portion 224 with the replacement privacy-nonrelevant data. In some disclosed embodiments the replacement privacy-nonrelevant data may be artificial data. For example, plate blurred images may be added to the privacy-nonrelevant portions 232 to replace the areas in the privacy-nonrelated portions 232 from where the privacy-relevant portion 224 was separated. For example, the license plate 218 and the person 216 in image 214 may be replaced with blurred image portions. In some disclosed embodiments, the license plate 218 and the person 216 may be replaced with generated images. The generated images may be output from a Generative Adversarial Network ("GAN") or a transformer technique, for example. In some disclosed embodiments, a facial image of person may be replaced with a generated, generic, facial image of a person.

In a first training operation 212, a first set of training data is generated and a machine-learning model 234 is trained on the first set of training data. The first training operation 212 may be performed in a computationally-efficient computing environment since no privacy-relevant data is involved in the first training operation 212. In some embodiments, elements 238 of the first set of training data may be generated by combining the privacy-nonrelevant portion 226 of each image with the labeled items 232 of the privacy-nonrelevant portion 226. The machine-learning model 234 may be trained on the first set of training data.

Figure 3:
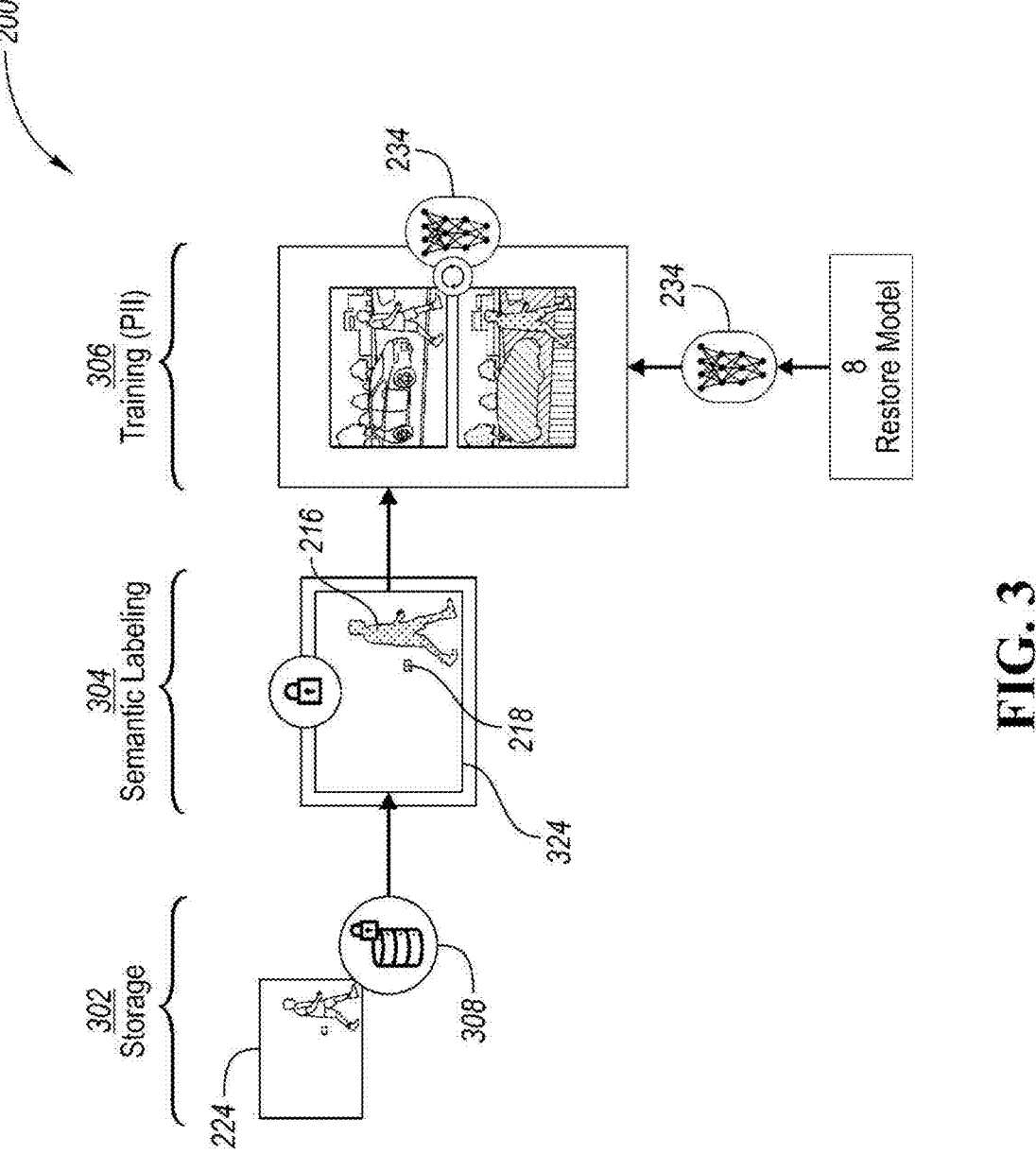
FIG. 3 illustrates operations of an example method in accordance with disclosed embodiments.

FIG. 3 illustrates additional example operations 302, 304, 306 of the method 200 in accordance with disclosed embodiments. The operations 302, 304, 306 may be performed in a privacy-secure computing environment. The privacy-secure computing environment may include, for example, computing environments with trusted hardware (e.g., Trusted Execution Environment ("TEE")) or computing environments that use other Privacy Enhancing Technologies ("PET") (e.g., Homomorphic Encryption ("HE") or Secure Multi-Party Computation ("SMPC")).

In a storage operation 302, privacy-relevant portions 224 are retrieved from a secure storage facility 308 (e.g., a secure database). In a second semantic labeling operation 304, items in the privacy-relevant portion 224 are labeled to generate a second set of training data. For example, the person 216 and the license plate 218 in the privacy-relevant portion 224 may be labeled 304 to generate an element of the second set of training data. In some disclosed embodiments, the original set of training data elements, including image 214, can be amended to include the labeled items of privacy-relevant data to generate the elements of the second set of training data. For example, the labeled portions 216, 218 in 324 may be added to the original image 214 to generate an element of the second set of training data. In some disclosed embodiments, an original training element may be reconstructed, for example, by combining privacy-relevant portion 224 with privacy-nonrelevant portion 226 as well as combining labeled items 232 with labeled portions 324. In some disclosed embodiments, the labeled portions 216, 218 in 324 may be added to the privacy-nonrelevant labels in 232; and the privacy-nonrelevant portion 226 may be added to the privacy-relevant portion 224 to generate an element of the second set of training data. In disclosed embodiments, training elements of a second set of training data may include input/output pairs where the input in an input/output pair comprises an original (e.g., before separating and labeling) data element (e.g., an image) along with labels corresponding to both privacy-relevant portions and privacy-nonrelevant portions.

In a training operation 306, the machine-learning model 234 may be retrained using the second set of training data. In disclosed embodiments, the retraining of the machine-learning model 234 may include applying a transfer-learning technique with the second set of training data.

Figure 4:
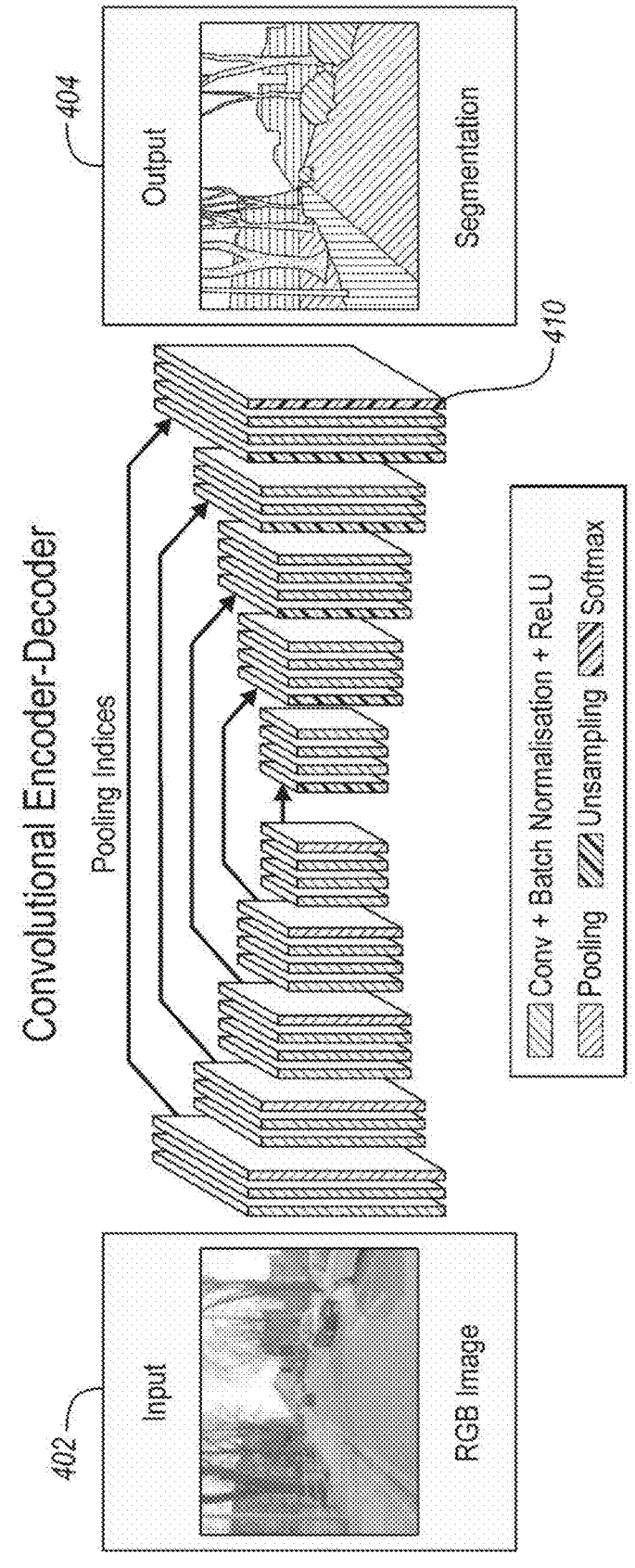
FIG. 4 illustrates an example machine-learning model in accordance with disclosed embodiments.

FIG. 4 illustrates an example machine-learning model 400 in accordance with disclosed embodiments. The machine-learning model 400 may comprise a convolutional encoder-decoder. The machine-learning model 400 may include one or more convolutional layers, batch normalization layers, ReLU layers, pooling layers, unsampling layers, and softmax layers as indicated in FIG. 4. The machine-learning model 400 may receive RGB images as input 402 and may operate to produce segmented images as output 404. The RGB image input 402 may include privacy-relevant data and the machine-learning model 400 may be trained in accordance with disclosed embodiments to protect the privacy-relevant data in the RGB input 402.

In some disclosed embodiments, the machine-learning model 400 may only include labels for privacy-nonrelevant data in the softmax layer 410 after being trained in a first semantic labeling operation 210. In the training operation 306, the softmax layer 410 may be replaced with a softmax layer with one that includes labels for both privacy-nonrelevant data and privacy-relevant data. In some disclosed embodiments, the softmax layer 410 may include both labels for privacy-nonrelevant data and labels for privacy-relevant data. The labels for privacy-relevant data may be trained in the second semantic labeling operation 304.

Figure 5:
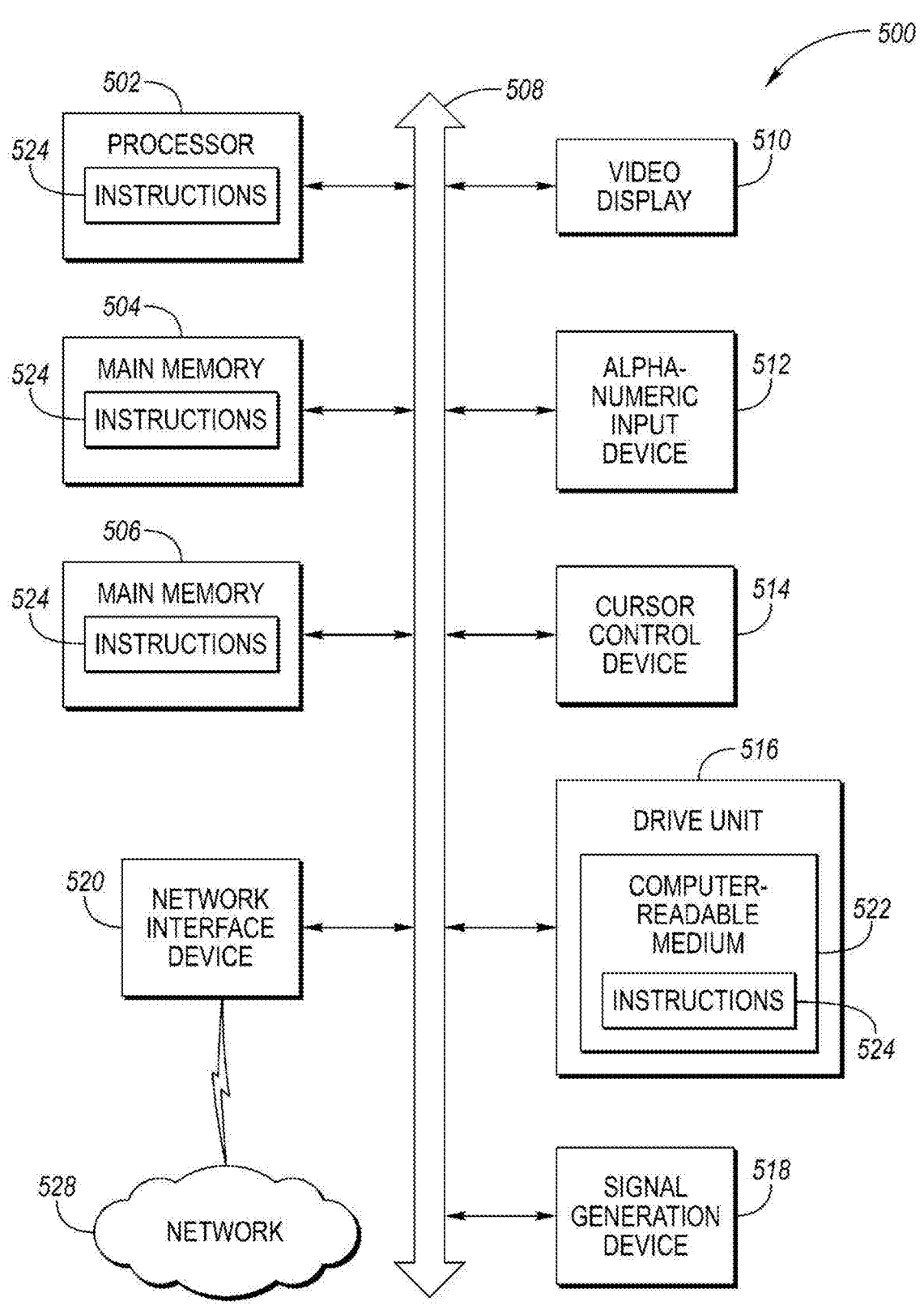
FIG. 5 illustrates an example computing system in accordance with disclosed embodiments.

FIG. 5 shows a block diagram of an example embodiment of a general computer system 500. The computer system 500 can include a set of instructions that can be executed to cause the computer system 500 to perform any one or more of the methods or computer-based functions disclosed herein. For example, disclosed embodiments of privacy-secure computing environments and disclosed embodiments of computationally-efficient computing environments may comprise embodiments of computer system 500. The computer system 500 may be connected to other computer systems or peripheral devices via a network. Additionally, the computer system 500 may include or be included within other computing devices.

As illustrated in FIG. 5, the computer system 500 may include one or more processors 502. The one or more processors 502 may include, for example, one or more central processing units (CPUs), one or more graphics processing units (GPUs), or both. The computer system 500 may include a main memory 504 and a static memory 506 that can communicate with each other via a bus 508. As shown, the computer system 500 may further include a video display unit 510, such as a liquid crystal display (LCD), a projection television display, a flat panel display, a plasma display, or a solid-state display. Additionally, the computer system 500 may include an input device 512, such as a remote-control device having a wireless keypad, a keyboard, a microphone coupled to a speech recognition engine, a camera such as a video camera or still camera, or a cursor control device 514, such as a mouse device. The computer system 500 may also include a disk drive unit 516, a signal generation device 518, such as a speaker, and a network interface device 520. The network interface 520 may enable the computer system 500 to communicate with other systems via a network 528.

In some embodiments, as depicted in FIG. 5, the disk drive unit 516 may include one or more computer-readable media 522 in which one or more sets of instructions 524, e.g., software, may be embedded. For example, the instructions 524 may embody one or more of the methods or functionalities, such as the methods or functionalities disclosed herein. In a particular embodiment, the instructions 524 may reside completely, or at least partially, within the main memory 504, the static memory 506, and/or within the processor 502 during execution by the computer system 500.

The main memory 504 and the processor 502 also may include computer-readable media.

In some embodiments, dedicated hardware implementations, such as application specific integrated circuits, programmable logic arrays and other hardware devices, can be constructed to implement one or more of the methods or functionalities described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the system 500 may encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or functionalities disclosed herein.

In some embodiments, some or all of the computer-readable media will be non-transitory media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for managing privacy-relevant data, comprising:

for data elements in a set of training data elements containing privacy-relevant data, separating a privacy-relevant portion of each data element from a remaining privacy-nonrelevant portion of each data element, wherein the separating is performed in one or more privacy-secure computing environments configured to securely protect the privacy-relevant portion of each data element;

generating, in one or more computationally-efficient computing environments that are more computationally efficient than the one or more privacy-secure computing environments, a first set of training data, wherein the generating of the first set of training data includes labeling one or more items in the privacy-nonrelevant portion of each data element;

training, in the one or more computationally-efficient computing environments, a machine-learning model on the first set of training data;

generating, in the one or more privacy-secure computing environments, a second set of training data, wherein generating of the second set of training data includes labeling one or more items in the privacy-relevant portion of each data element to obtain one or more labeled items and adding the one or more labeled items to the corresponding data element to form the second set of training data used for retraining the machine-learning model; and retraining, in the one or more privacy-secure computing environments, the machine-learning model, wherein the retraining includes applying a transfer-learning technique with the second set of training data.

2. The method of claim 1, wherein the one or more privacy-secure computing environments includes a trusted execution environment ("TEE"), a Privacy Enhancing Technology ("PET"), or a Secure Multi-party Computation ("SMPC").

3. The method of claim 1, wherein the privacy-relevant portion of at least one data element includes a plurality of items of privacy-relevant information.

4. The method of claim 1, wherein at least one data element comprises at least one of image data, audio data, sensor data, and Global Positioning System ("GPS") data.

5. The method of claim 4, wherein each data element comprises at least one of image data, audio data, sensor data, and Global Positioning System ("GPS") data.

6. The method of claim 1, wherein the machine-learning model comprises a neural network.

7. The method of claim 1, wherein the neural network comprises a convolutional encoder-decoder.

8. The method of claim 1, further comprising:

prior to labeling items in the privacy-nonrelevant portion of each data element, combine the privacy-nonrelevant portion of each data element with replacement privacy-nonrelevant data to replace the separated privacy-relevant portion with the replacement privacy-nonrelevant data.

9. The method of claim 8, wherein the replacement privacy-nonrelevant data comprises artificial data.

10. The method of claim 9, wherein the artificial data is a generated image of a face.

11. The method of claim 9, wherein the artificial data is output from a Generative Adversarial Network ("GAN") or a transformer technique.

12. The method of claim 11, wherein the output is a generated image of a face.

13. A non-transitory memory comprising processor-executable instructions that when executed by one or more processors causes a system to perform operations including:

for data elements in a set of training data elements containing privacy-relevant data, separating a privacy-relevant portion of each data element from a remaining privacy-nonrelevant portion of each data element, wherein the separating is performed in one or more privacy-secure computing environments configured to securely protect the privacy-relevant portion of each data element;

generating, in one or more computationally-efficient computing environments that are more computationally efficient than the one or more privacy-secure computing environments, a first set of training data, wherein the generating of the first set of training data includes labeling one or more items in the privacy-nonrelevant portion of each data element;

training, in the one or more computationally-efficient computing environments, a machine-learning model on the first set of training data;

generating, in the one or more privacy-secure computing environments, a second set of training data, wherein generating of the second set of training data includes labeling one or more items in the privacy-relevant portion of each data element to obtain one or more labeled items and adding the one or more labeled items to the corresponding data element to form the second set of training data used for retraining the machine-learning model; and retraining, in the one or more privacy-secure computing environments, the machine-learning model, wherein the retraining includes applying a transfer-learning technique with the second set of training data.

14. The non-transitory memory of claim 13, wherein:

wherein each data element comprises at least one of image data, audio data, sensor data, and Global Positioning System ("GPS") data and wherein the machine-learning model comprises a neural network.

15. The non-transitory memory of claim 14, wherein the neural network comprises a convolutional encoder-decoder.

16. The non-transitory memory of claim 15, wherein the operations further include:

prior to labeling items in the privacy-nonrelevant portion of each data element, combining the privacy-nonrelevant portion of each data element with replacement privacy-nonrelevant data to replace the separated privacy-relevant portion with the replacement privacy-nonrelevant data.

17. A system, comprising:

one or more processors; and non-transitory memory communicatively connected to the one or more processors, the non-transitory memory comprising processor-executable instructions that when executed by the one or more processors causes the system to perform operations including:

for data elements in a set of training data elements containing privacy-relevant data, separating a privacy-relevant portion of each data element from a remaining privacy-nonrelevant portion of each data element, wherein the separating is performed in one or more privacy-secure computing environments configured to securely protect the privacy-relevant portion of each data element;

generating, in one or more computationally-efficient computing environments that are more computationally efficient than the one or more privacy-secure computing environments, a first set of training data, wherein the generating of the first set of training data includes labeling one or more items in the privacy-nonrelevant portion of each data element;

training, in the one or more computationally-efficient computing environments, a machine-learning model on the first set of training data;

generating, in the one or more privacy-secure computing environments, a second set of training data, wherein generating of the second set of training data includes labeling one or more items in the privacy-relevant portion of each data element to obtain one or more labeled items and adding the one or more labeled items to the corresponding data element to form the second set of training data used for retraining the machine-learning model; and retraining, in the one or more privacy-secure computing environments, the machine-learning model, wherein the retraining includes applying a transfer-learning technique with the second set of training data.

18. The system of claim 17, wherein:

wherein the one or more privacy-secure computing environments includes a trusted execution environment ("TEE"), a Privacy Enhancing Technology ("PET"), or a Secure Multi-Party Computation ("SMPC").

19. The system of claim 18, wherein the neural network comprises a convolutional encoder-decoder.

20. The system of claim 19, wherein the operations further include:

prior to labeling items in the privacy-nonrelevant portion of each data element, combining the privacy-nonrelevant portion of each data element with replacement privacy-nonrelevant data to replace the separated privacy-relevant portion with the replacement privacy-nonrelevant data.

* * * * *